(12) United States Patent
Olkkonen et al.

(10) Patent No.: US 6,407,999 B1
(45) Date of Patent: Jun. 18, 2002

(54) METHOD AND ROUTER IN A PACKET NETWORK WITH PRIORITY CLASSES

(75) Inventors: Mikko Olkkonen, Helsinki; Sami Huusko, Espoo, both of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/091,169

(22) PCT Filed: Oct. 7, 1997

(86) PCT No.: PCT/FI97/00606

§ 371 (c)(1),
(2), (4) Date: Jun. 8, 1998

(87) PCT Pub. No.: WO98/16036

PCT Pub. Date: Apr. 16, 1998

(30) Foreign Application Priority Data

Oct. 8, 1996 (FI) .................................................. 964034

(51) Int. Cl.[7] .............................................. H04Q 11/04
(52) U.S. Cl. .................. 370/389; 370/229; 370/395.42; 370/412; 370/468
(58) Field of Search ................................. 370/389, 390, 370/395, 396, 397, 399, 412, 414, 416, 418, 447, 465, 468, 229, 230, 231, 232, 233, 234, 235, 236, 413, 395.1, 395.2, 395.21, 395.41, 395.42, 395.43

(56) References Cited

U.S. PATENT DOCUMENTS

| 5,231,633 A | | 7/1993 | Hluchyj et al. ............. 370/94.1 |
| 5,347,511 A | | 9/1994 | Gun .............................. 370/54 |
| 5,550,823 A | * | 8/1996 | Irie et al. ..................... 370/413 |
| 5,555,264 A | * | 9/1996 | Sallberg et al. ............. 370/414 |
| 5,745,695 A | * | 4/1998 | Gilchrist et al. ............. 370/330 |
| 5,848,297 A | * | 12/1998 | Krein et al. ................. 395/876 |
| 5,892,769 A | * | 4/1999 | Lee ............................. 370/447 |
| 5,917,822 A | * | 6/1999 | Lyles et al. ................. 370/395 |
| 5,983,278 A | * | 11/1999 | Chong et al. ............... 370/414 |

FOREIGN PATENT DOCUMENTS

| EP | 404 443 | 12/1990 | ........... H04L/12/56 |
| EP | 407 161 | 1/1991 | ........... H04L/12/56 |
| WO | 96/00474 | 1/1996 | ........... H04L/12/56 |

OTHER PUBLICATIONS

Digital Cellular Telecommunications System (Phase 2t), Global System for Mobile Communications, TS 02.60 V5.0.0 (1997–02) p. 1–47.
Digital Cellular Telecommunications System (Pahse 2t), Global System for Mobile Communications, GSM 03.60 v5.1.0 1997–10 p. 1–90.
Patent Abstract of Japan, vol. 9, No. 49, E–300 JP 59–190757.

* cited by examiner

Primary Examiner—Douglas Olms
Assistant Examiner—Shick Hom
(74) Attorney, Agent, or Firm—Pillsbury Winthrop LLP

(57) ABSTRACT

A method and an equipment for packet prioritization when routing data packets is presented. Several priority classes are defined for the packets, and a first threshold value and a second, higher, threshold value is defined for each prioity class. In association with each packet, the oldest packet of a given prioritiy class is selected, and if the packet is older than the second threshold value of the priority class concerned, the packet is discarded, and the next priority class is selected. If the packet is older than the first threshold value of the priority class concerned, at least one packet of this priority class is transmitted until the oldest packet in the priority class is younger than the first threshold value of the priority class concerned, whereupon the next priority class is selected.

17 Claims, 3 Drawing Sheets

METHOD AND ROUTER IN A PACKET NETWORK WITH PRIORITY CLASSES

BACKGROUND OF THE INVENTION

The invention relates to a method and an equipment for packet prioritization when routing data packets.

FIG. 1 shows the parts of a mobile system that are relevant to the invention. Mobile Stations MS communicate with Base Transceiver Stations BTSn over an air interface Um. The base transceiver stations are controlled by Base Station Controllers BSC associated with Mobile Switching Centres MSC. A subsystem controlled by a base station controller BSC, including the base transceiver stations BTS controlled by the system, is called a Base Station Subsystem BSS. The interface between the exchange MSC and the base station subsystem BSS is called an A interface. The part of the mobile system that is on the MSC side of the A interface is called a Network Subsystem NSS. The interface between the base station controller BSC and the base transceiver station BTS, in turn, is called an Abis interface. The mobile switching centre MSC connects incoming and outgoing calls. It performs similar functions as an exchange of a Public Switched Telephone Network PSTN. In addition to these, it also performs functions that are typical of mobile communication only, such as subscriber location management, in cooperation with the subscriber registers of the network, which are not shown separately in FIG. 1.

A conventional radio connection used in digital mobile systems is a circuit-switched connection, which means that resources allocated to a subscriber are reserved for the connection concerned for the entire duration of the call. A General Packet Radio Service GPRS is a new service designed for digital mobile systems, such as the GSM system. The packet radio service is described in ETSI specifications TC-TR-GSM 02.60 and 03.60. The packet radio service makes it possible to offer the user of a mobile station MS a packet-form radio connection effectively utilizing radio resources. On a packet-switched connection, radio resources are reserved only when speech or data is to be sent. The speech or data is collected in packets of a certain length. When a packet like this has been transmitted over the air interface Um, and the transmitting party does not immediately have a new packet to send, the radio resource can be released to other subscribers.

The system of FIG. 1 comprises a separate Serving GPRS Support Node or SGSN 15, which controls the operation of the packet data service on the network side. The control comprises, for example, logging the mobile station on and off the system, location updating of the mobile station, and routing of the data packets to the correct destination. In the present application, 'data' is interpreted widely to mean any information transmitted in a digital mobile system, for example speech encoded in digital form, data transmission between computers, or telefax data. An SGSN node can be in connection with a base transceiver station BTS, a base station controller BSC or a mobile switching centre MSC, or it may be separate from them. The interface between an SGSN node and a base station controller BSC is called a Gb interface.

Information, such as control signalling and speech or other data is transmitted in the packet network by GPRS frames. Each frame F comprises a header 1 and a data part 2. (In addition, frames transmitted over the air interface, in particular, typically contain different bit patterns for synchronization, but this kind of frame parts are not essential to the invention.) In order that the system would know which mobile station has sent the frame, the header 1 comprises an identity identifying the mobile station, for example a Temporary Logical Link Identity TLLI. When a mobile station registers in the GPRS network, the network gives the mobile station a TLLI identity for use during the GPRS connection. After the GPRS connection, the same TLLI identity can be reassigned to some other mobile station.

In the header 1, it is also sometimes possible to use a Network Layer Service access point Identity NLSI as well as the TLLI identity to indicate the application protocol used by the mobile station.

In a packet radio network it is possible to imagine a situation in which a subscriber using a personal computer PC communicates with another computer 14 through a packet network 10, data network 11, router 13 and a local area network LAN. One long data transmission or several short consecutive data transmissions are in progress between the computers PC and 14, for example using the Internet FTP protocol. Simultaneously, the user of the computer PC or some other subscriber initiates an interactive session, for example using the Internet Telnet protocol. If the packets of each interactive session had to wait at the nodes over the connection for the termination of the long data transmission, then the response times would grow so long in the interactive session that it would no longer be sensible to use the service.

Network operators typically define several different qualities of service QoS in such a way that the propagation delay in a higher quality of service (and possibly also the probability for packet loss) is smaller than in a lower quality of service. In this invention, the most important parameter associated with a quality of service is the propagation delay. The operator may define e.g. three qualities of service for which two propagation delays $T_{AVE}$ and $T_{95}$, have been defined, of which the former ($T_{AVE}$) defines an average propagation delay of a packet in the operator's network and the latter ($T_{95}$,) defines such a delay that 95 percent of the packets are transmitted by a smaller delay than $T_{95}$. The correspondence between qualities of service and propagation delays could be e.g. as follows:

TABLE 1 typical correspondence between quality of service and propagation delay

| Quality of service | $T_{AVE}$ (ms) | $T_{95}$ (ms) |
| --- | --- | --- |
| 1 | 400 | 600 |
| 2 | 500 | 800 |
| 3 | 600 | 1200 |

(Obviously, these values only serve as an example. There may be more than three qualities of service, the median can be used instead of an arithmetic average, and instead of 95 percent, other percentages may also be used.)

A network operator's problem is associated with the fact that traffic volumes show great variations depending on the time of day, and randomly. The traffic also shows a continuous, often noteworthy increase. Typically a subscriber signs a contract with an operator concerning a given quality of service and the maximum delays corresponding to the quality of service. As traffic increases (occasionally or permanently), the delays experienced by the subscriber exceed the maximum values set on said quality of service. The subscriber makes a complaint to the operator who has to allocate more telecommunication resources. As the number of users and the traffic increase, the loop recurs. It would be advantageous for the operator to stretch the existing transmission capacity as far as possible, thus enabling new investments to be postponed and newer technique being acquired in connection with the investments.

BRIEF DESCRIPTION OF THE INVENTION

On the basis of the above, it is the object of the invention to provide a method and an equipment for routing packets in such a way that the operator's network offers an optimal transmission capacity when the contract between the operator and a subscriber complies with what is shown in Table 1.

The object of the invention is achieved by means of a method which is characterized in what is set forth in the independent claims. The dependent claims disclose the preferred embodiments of the invention.

The invention is based on the idea that if the propagation delay of a given packet has exceeded a maximum propagation delay $T_{95}$, the packet can no longer be saved in such a way that the operator would have fulfilled his obligations as to said packet. This kind of situation arises when the traffic in a router momentarily exceeds the transmission capacity of the router. If the operator tried to be fair to all subscribers and delay all packets equally, this would be likely to lead to the operator not fulfilling his obligations to the majority of subscribers. The situation could be e.g. such that only 90 percent of all packets can be transmitted within a time less than the delay $T_{95}$. Nearly all subscribers would then feel that the operator has not fulfilled his obligations. It is better for the operator (and the majority of the subscribers) that the available resources are allocated between a number of subscribers and connections in such a way that the conditions of the contract are fulfilled, i.e. the propagation delays are not exceeded. In this case the router allocates resources primarily to packets that still can be transmitted within the propagation delay defined in the contract. In accordance with an embodiment, the router may even discard a packet that no longer can be transmitted within the agreed propagation delay, enabling the resources to be allocated more efficiently to the packets that still can be delivered within the agreed time. The discarded packets are then replaced at a higher protocol layer where the receiver requests the transmitter to resend the missing packets.

BRIEF DESCRIPTION OF THE DRAWINGS

In the following the invention will be described in more detail in connection with preferred embodiments with reference to the attached drawings, in which.

DETAILED DESCRIPTION OF THE INVENTION

Figure 1:
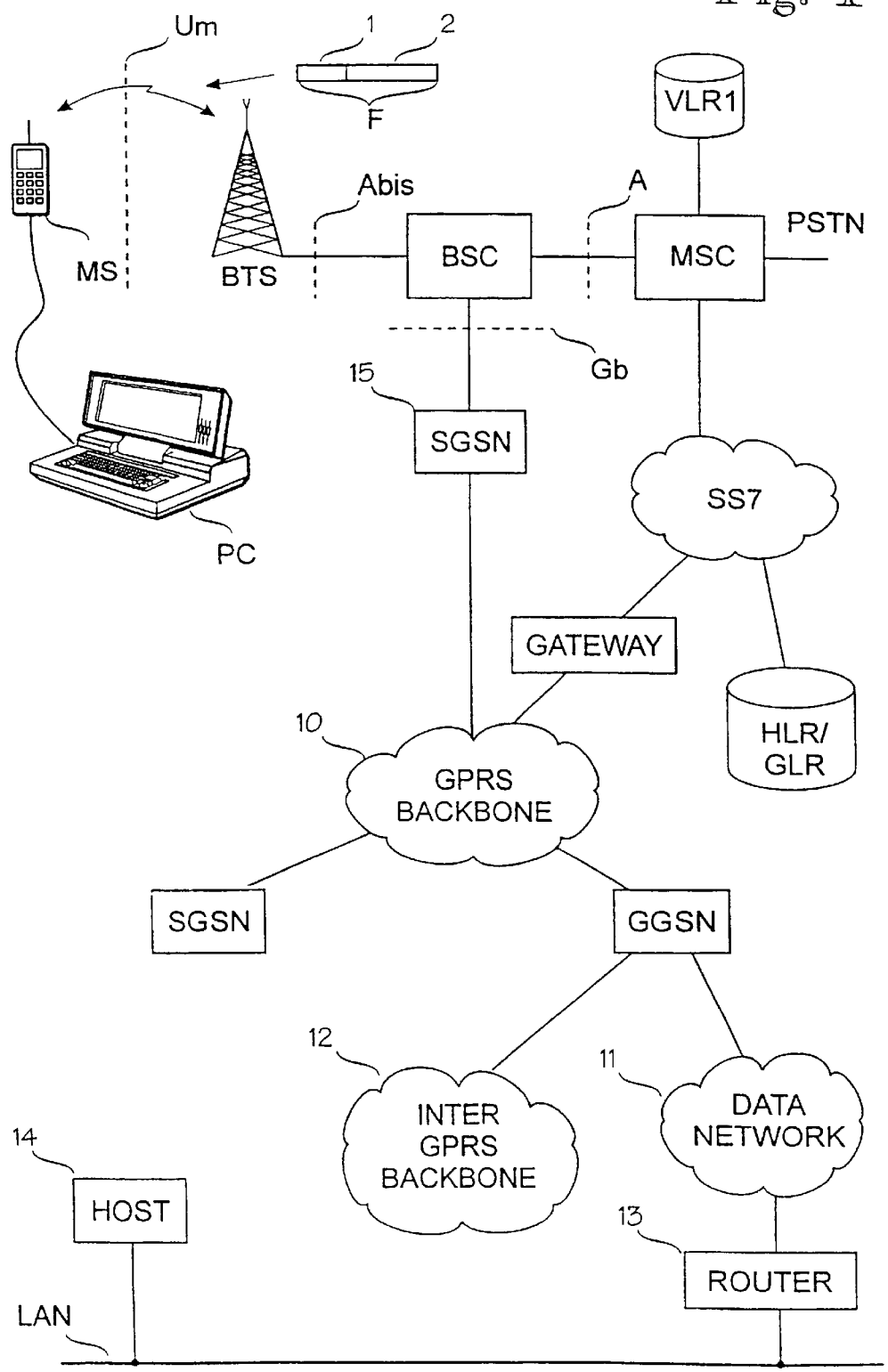
FIG. 1 shows the parts of a mobile communications system that are essential to the invention.
Figure 2:
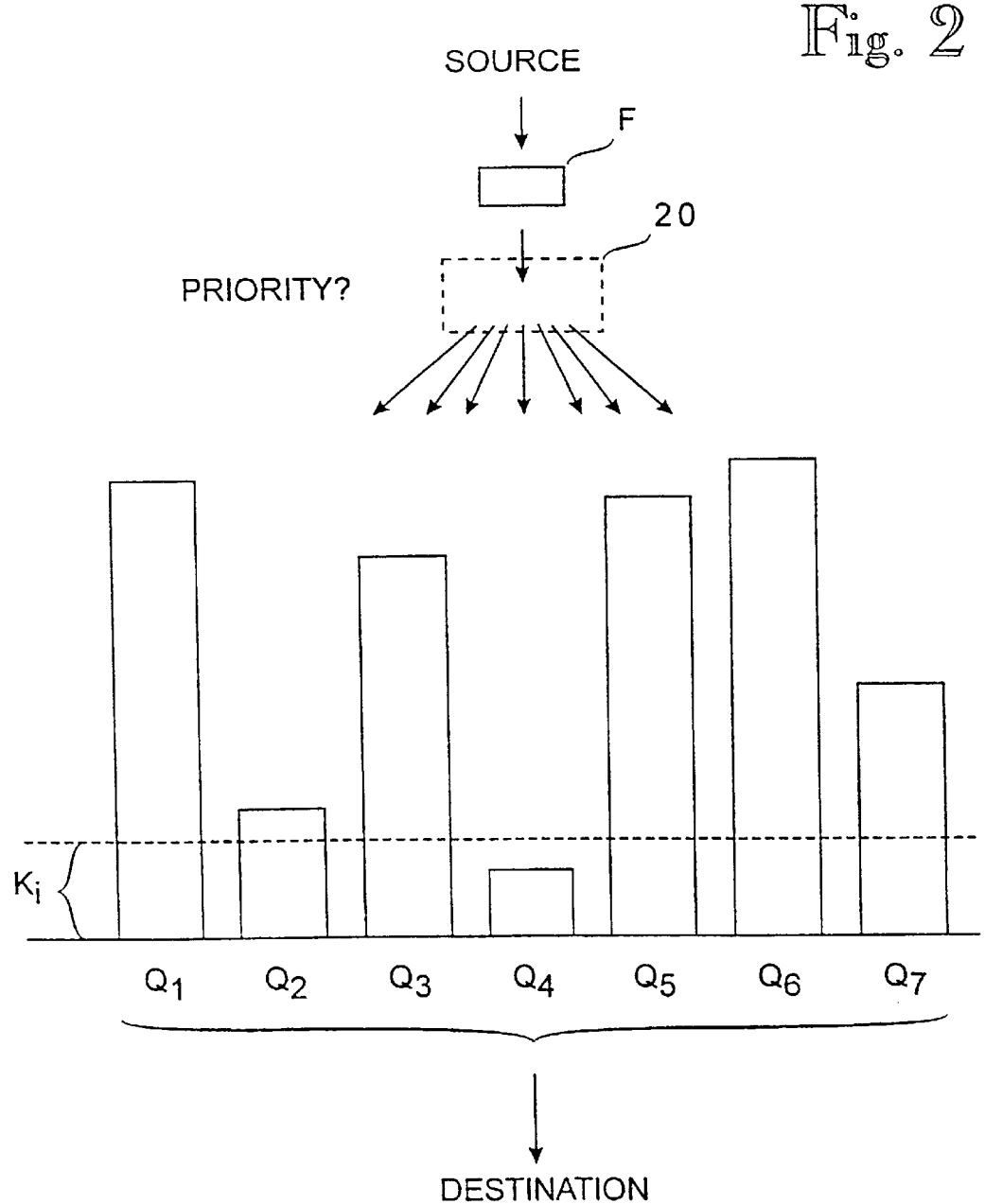
FIG. 2 is a block diagram showing how packets are arranged in a queue.

Referring to FIG. 1 a support node SGSN 15 in a packet network functions as a router and buffers data in a queue, forwarding it through a base station system BSC—BTS to a mobile station MS and a computer PC connected to it. Since an air interface Um forms a clear bottleneck, a queue is formed at the SGSN node 15. Referring now to FIG. 2, the priority class of a packet is determined when packets F are received at the router 15. Block 20 illustrates this function.

In a simple manner, the priority class can be determined directly based on the quality of service QoS determined in the subscriber contract. Alternatively, the subscriber may determine the priority class based on the connection and/or the application. The subscriber can be identified on the basis of a TLLI identity sent in a header 1 of a frame F. The TLLI identity identifies each connection between the mobile station and the SGSN node. The application can be identified unambiguously on the basis of a port number of a TCP protocol. In FIG. 2, packet processing is illustrated by assigning a queue to each priority class, the queues totalling 7 (Q1–Q7) in FIG. 2 by way of example. In the present application, 'queue' means any arrangement by which the same effect is achieved as by physical placement of packets in different queues. With regard to the use of memory, it may be more economical to keep only pointers relating to the packets in different queues. A queue can be implemented, for example, as a linked list in which each element of the list contains a pointer pointing to the next and/or previous element. In addition, a packet-specific time of arrival of the packet at the router is stored in the router.

A first propagation delay threshold value T1 and a second, higher, threshold value T2 is defined for each priority class. The first threshold value T1 is associated with the average propagation delay $T_{AVE}$. Similarly, the second threshold value T2 is associated with the 95 percent propagation delay $T_{95}$. However, in addition to the router, the packet is also subjected to delays elsewhere, particularly on the radio path. The other delays are, however, often substantially constant, and consequently their empirical estimated portion can be subtracted from the delays $T_{AVE}$ and $T_{95}$. If the estimated delay outside the router is denoted by $T_0$, then $T_1=T_{AVE}-T_0$ and $T_2=T_{95}-T_0$.

An average value of e.g. the packets of a corresponding priority class, preferably a moving average, can be used as an estimate of the packet propagation delay. An alternative estimate of the propagation delay is e.g. the actual propagation delay of the packet concerned.

Figure 3:
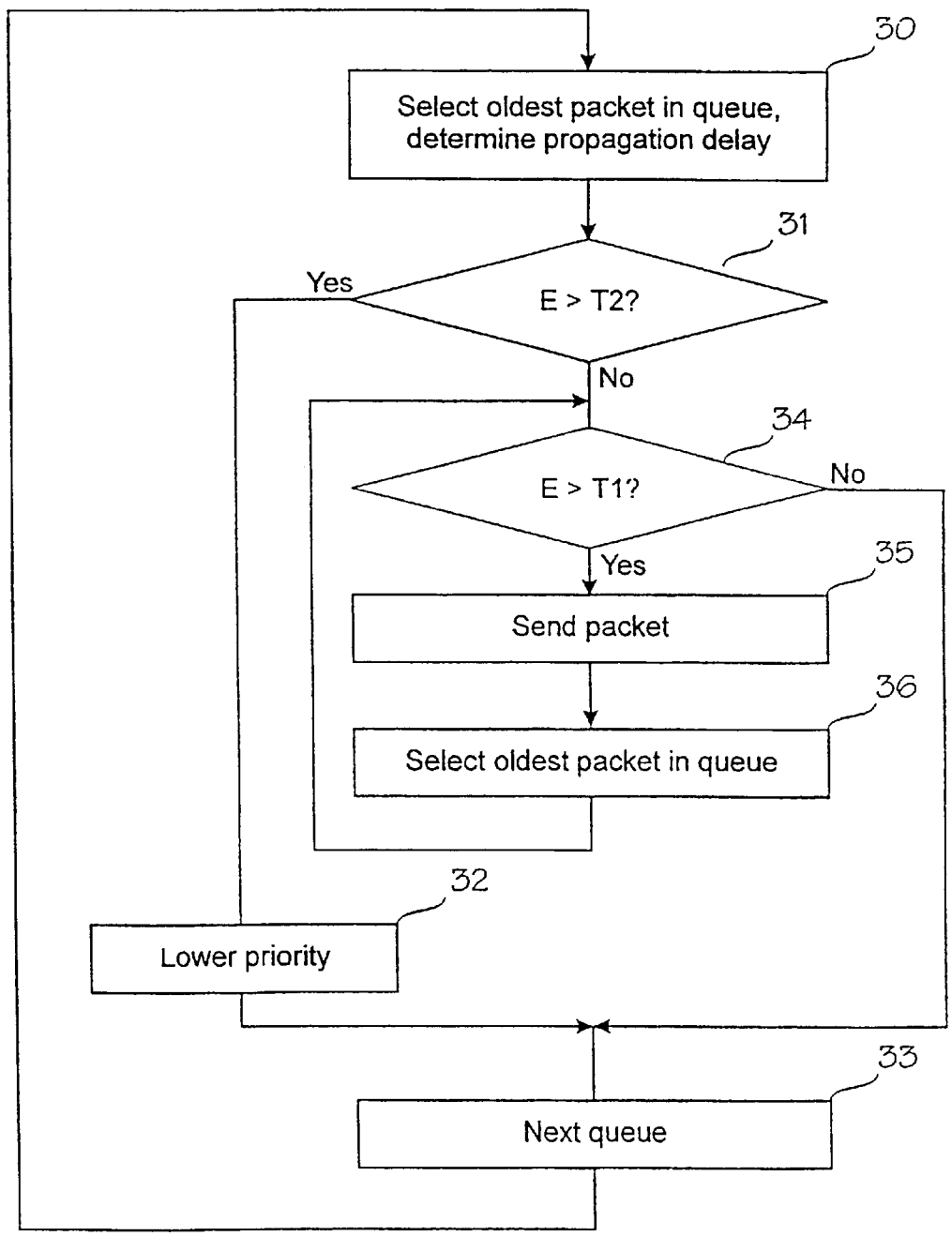
FIG. 3 is a flow diagram illustrating the operation of the invention.

Referring to FIG. 3, a possible method of implementing the inventive idea is illustrated. The concepts "packet age", "old packet", and "young packet" are associated with the time that the packet F has waited in the router. In connection with each packet, in step 30, the oldest packet F of a given priority class is selected. This is carried out e.g. in such a way that each priority class is assigned its own FIFO queue, as described in FIG. 2, the packets being added to the end of the queue and unloaded from the start of the queue. In step 31, if the age of the packet is higher than the second threshold value T2 of the priority class concerned, the next step is 32 where said packet F is discarded. In step 33 the next priority class is selected. If the packet is not older than T2 in step 31, the next step is 34 where the age of the packet is compared with the first threshold value T1. If in step 34 said packet F is older than the first threshold value T1 of the priority class concerned, the next step is 35 where at least one packet of this priority class is transmitted. Packets are transmitted until the oldest packet of the priority class is younger than the first threshold value T1 of the priority class concerned, whereupon the next priority class is selected.

The above priority class may be the same as the quality of service QoS determined in the subscriber contract. It is also feasible that the priority class is negotiated connection-specifically at the beginning and/or during a connection.

The quality of service can be signalled to the routers on the packet network e.g. by providing each packet with a code indicating the quality of service. Since in the GPRS specifications four alternative qualities of service are defined, it is possible to identify them by two bits. Alternatively, a new quality of service can be signalled by a separate message indicating a change in the quality of service, the message being sent to a router located somewhere over the connection. The router will store the changed quality of service in its memory.

When each packet is provided with a code indicating the quality of service, each node over the connection can independently. make the decisions concerning priority. The priority can be easily changed by a 2-bit identity without a separate message indicating a change in the quality of service. The priority of individual packets can be changed easily without first sending for example, a message raising the priority and then, after the packet, a message lowering the priority.

When the quality of service changes and a separate message indicating the change is sent, it is not necessary to add a code indicating the quality of service to each separate packet. Another advantage achieved is simplification of billing, since a change in the quality of service, which is the billing criterion, is signalled by a separate message.

Packets destined to a mobile station do usually not have a mechanism for changing the quality of service during the session, so the quality of service is usually defined as the subscriber registers to use a GPRS connection.

As an alternative to determining the age of the packet packet-specifically in step 34, a predetermined number of packets may be sent from said priority class, naturally not exceeding the number of packets in said priority class. Parameter Ki in FIG. 2 illustrates the amount of data sent from each queue at one go. As compared with prior art routing using a single queue, the service is improved if a plural number of queues Qi is used and parameter Ki is constant. The service can be further improved by adjusting parameter Ki. for example, on the basis of the quality of service such that more data is sent from the high-priority queues at one go than from the low-priority queues. Queue Q2 illustrates a situation where a small amount of data remains in the queue in addition to amount Ki. Transmission of entire queue Q2 here clearly improves the operation of the application concerned without that the other subscribers and/or applications would suffer too much. A suitable threshold value for such exceeding of Ki is, for example, 30 to 50%. Correspondingly, Q4 illustrates a queue comprising little data. Transmission of short queues before long ones shortens the average waiting time.

Similarly, an alternative to determining the age of the packets to be discarded packet-specifically in steps 31–32, all packets of the same connection can be discarded from said priority class, since the protocol of the upper network layer has to resend such packets in any case.

Routers are usually implemented by means of a digital memory and a processor. The method of the invention and its different variations are implemented as changed in the router processor software. Routing packets according to the invention has been described in association with a node in the GPRS network by way of example. It is obvious to those skilled in the art that similar routers may be used in any other telecommunication systems. Thus the invention and its embodiments are not restricted to the above examples, but may vary within the scope of the claims.

What is claimed is:

1. A method of routing packets in a router of a packet network, the method comprising:

defining several priority classes for the packets;

defining a first propagation delay threshold value and a second, higher, propagation delay threshold value for each of the several priority classes;

selecting from each of the priority classes, an oldest packet;

determining an estimate of a propagation delay of at least one of the packets;

lowering a priority of at least one packet, if the estimate of the propagation delay associated with that at least one packet is higher than the second threshold value of a present priority class associated with that at least one packet;

transmitting at least one packet of the present priority class if the estimate of the propagation delay associated with that at least one packet is higher than the first threshold value but lower than the second threshold value of the present priority class; and selecting a next priority class;

wherein the first threshold value equals an average propagation delay determined for the priority class minus an estimated propagation delay of the packet in other parts of the network, and the second threshold value is a maximum propagation delay defined for the priority class, wherein the maximum propagation delay is based on a delay that a majority of the packets has to fall short of minus the estimated propagation delay of the packet in other parts of the network.

2. The method of claim 1, wherein the transmitting the at least one packet includes transmitting a predetermined number of packets including the at least one packet, wherein the predetermined number does not exceed a number of packets included in the present priority class.

3. The method of claim 1, wherein the transmitting the at least one packet is performed until a propagation delay estimate associated with the oldest packet in the present priority class is less than the first threshold value of the present priority class.

4. The method of claim 1, wherein the lowering of the priority of at least one packet is performed by discarding that at least one packet.

5. The method of claim 1, further comprising determining the priority class of the at least one packet based on a quality of service of a connection associated with the at least one packet.

6. The method of claim 1, wherein the estimate of the propagation delay of the at least one packet is a moving average of propagation delays of the packets of the present priority class associated with the at least one packet.

7. The method of claim 1, further comprising using the propagation delay of the at least one packet as the estimate of the propagation delay associated with that at least one packet.

8. The method of claim 1, wherein the packet network is a General Packet Radio Service network and the router is at least one of a Serving General Packet Radio Service Support Node and a General Packet Radio Service Gateway Support Node.

9. A router in a packet network, the router comprising:

means for receiving and transmitting a plurality of packets;

means for assigning a priority class to each of the plurality of packets in such a way that a first threshold value and a second, higher, threshold value is associated with each priority class;

means for selecting an oldest packet from each priority class;

means for determining an estimate of a propagation delay corresponding to at least one packet in a present priority class;

means for lowering a priority of at least one packet if the estimate of the propagation delay of that at least one packet is higher than the second threshold value of the present priority class;

means for selecting at least one packet if the estimate of the propagation delay is higher than the first threshold value of the present priority class, but lower than the second threshold value of the present priority class; and means for selecting a next priority class.

10. A router in a packet network, the router comprising:

means for defining several priority classes for the packets;

means for defining a first propagation delay threshold value and a second, higher, propagation delay threshold value for each of the several priority classes;

means for selecting from each of the priority classes, an oldest packet;

means for determining an estimate of a propagation delay of at least one of the packets;

means for lowering a priority of at least one packet, if the estimate of the propagation delay associated with that at least one packet is higher than the second threshold value of a present priority class associated with that at least one packet;

means for transmitting at least one packet of the present priority class if the estimate of the propagation delay associated with that at least one packet is higher than the first threshold value but lower than the second threshold value of the present priority class; and means for selecting a next priority class;

wherein the first threshold value equals an average propagation delay determined for the priority class minus an estimated propagation delay of the packet in other parts of the network, and the second threshold value is a maximum propagation delay defined for the priority class, wherein the maximum propagation delay is based on a delay that a majority of the packets has to fall short of minus the estimated propagation delay of the packet in other parts of the network.

11. The router of claim 10, wherein the router is operable to transmit a predetermined number of packets including the at least one packet, wherein the predetermined number does not exceed a number of packets included in the present priority class.

12. The router of claim 10, wherein the router is operable to perform transmission of the at least one packet until a propagation delay estimate associated with the oldest packet in the present priority class is less than the first threshold value of the present priority class.

13. The router of claim 10, wherein the router is operable to lower the priority of at least one packet by discarding that at least one packet.

14. The router of claim 10, further comprising means for determining the priority class of the at least one packet based on a quality of service of a connection associated with the at least one packet.

15. The router of claim 10, wherein the estimate of the propagation delay of the at least one packet is a moving average of propagation delays of the packets of the present priority class associated with the at least one packet.

16. The router of claim 10, further comprising means for using the propagation delay of the at least one packet as the estimate of the propagation delay associated with that at least one packet.

17. The router of claim 10, wherein the packet network is a General Packet Radio Service GPRS network and the router is at least one of a Serving GPRS Support Node and a GPRS Gateway Support Node node.

* * * * *